US009767806B2

(12) United States Patent
Giménez et al.

(10) Patent No.: US 9,767,806 B2
(45) Date of Patent: Sep. 19, 2017

(54) ANTI-SPOOFING

(71) Applicant: Cirrus Logic International Semiconductor Ltd., Edinburgh (GB)

(72) Inventors: Alfonso Ortega Giménez, Saragossa (ES); Luis Buera Rodriguez, Madrid (ES); Carlos Vaquero Avilés-Casco, Madrid (ES)

(73) Assignee: Cirrus Logic International Semiconductor Ltd., Edinburgh (GB)

( * ) Notice: Subject to any disclaimer, the term of this patent is extended or adjusted under 35 U.S.C. 154(b) by 187 days.

(21) Appl. No.: 14/495,391

(22) Filed: Sep. 24, 2014

(65) Prior Publication Data

US 2015/0088509 A1 Mar. 26, 2015

Related U.S. Application Data

(63) Continuation-in-part of application No. 14/083,942, filed on Nov. 19, 2013, now abandoned.

(30) Foreign Application Priority Data

Sep. 24, 2013 (EP) ..................... 13185783

(51) Int. Cl.
| | | |
|---|---|---|
| *G10L 15/00* | (2013.01) | |
| *G10L 17/22* | (2013.01) | |
| *G10L 21/00* | (2013.01) | |
| *H04N 7/26* | (2006.01) | |
| *G06F 17/00* | (2006.01) | |
| *H04B 15/00* | (2006.01) | |
| *G06F 17/30* | (2006.01) | |
| *G06K 9/00* | (2006.01) | |

(Continued)

(52) U.S. Cl.
CPC .............. *G10L 17/22* (2013.01); *G10L 17/02* (2013.01); *G10L 17/04* (2013.01)

(58) Field of Classification Search
USPC ....... 704/243, 205, 234, 246, 256, 247, 270, 704/249; 341/200; 381/94.1; 700/94; 726/19; 382/115
See application file for complete search history.

(56) References Cited

U.S. PATENT DOCUMENTS 5,583,961 A * 12/1996 Pawlewski .............. G10L 25/87
704/205
6,480,825 B1 11/2002 Sharma et al.
(Continued)

FOREIGN PATENT DOCUMENTS

| CN | 102831895 A | 12/2012 |
|---|---|---|
| WO | 2010066269 A1 | 6/2010 |

(Continued)

OTHER PUBLICATIONS

European Search Report for Application No. 14186220.1, dated Jul. 10, 2015.

(Continued)

*Primary Examiner* — Neeraj Sharma
(74) *Attorney, Agent, or Firm* — Jackson Walker L.L.P.

(57) ABSTRACT

System for classifying whether audio data received in a speaker recognition system is genuine or a spoof using a Gaussian classifier and method for classifying whether audio data received in a speaker recognition system is genuine or a spoof using a Gaussian classifier.

30 Claims, 4 Drawing Sheets

(51) Int. Cl.
  *G10L 17/02* (2013.01)
  *G10L 17/04* (2013.01)

(56) References Cited

U.S. PATENT DOCUMENTS

| | | | | |
|---|---|---|---|---|
| 6,760,701 | B2* | 7/2004 | Sharma | G10L 15/04 704/234 |
| 7,027,979 | B2* | 4/2006 | Ramabadran | G10L 21/038 704/205 |
| 7,580,832 | B2* | 8/2009 | Allamanche | G10L 25/48 341/200 |
| 8,131,543 | B1* | 3/2012 | Weiss | G10L 25/78 704/210 |
| 8,160,877 | B1* | 4/2012 | Nucci | G10L 17/06 704/246 |
| 8,489,399 | B2 | 7/2013 | Gross | |
| 8,762,149 | B2 | 6/2014 | Asenjo et al. | |
| 8,781,137 | B1* | 7/2014 | Goodwin | H04R 3/005 381/94.1 |
| 9,240,188 | B2* | 1/2016 | Paul | G10L 17/16 |
| 2003/0154084 | A1* | 8/2003 | Li | G06K 9/00228 704/273 |
| 2005/0096906 | A1* | 5/2005 | Barzilay | G06Q 30/06 704/249 |
| 2006/0178887 | A1* | 8/2006 | Webber | G10L 15/144 704/256 |
| 2007/0003110 | A1* | 1/2007 | Gutta | G06K 9/00006 382/115 |
| 2007/0055500 | A1* | 3/2007 | Bilobrov | G06F 17/30743 704/217 |
| 2008/0172230 | A1* | 7/2008 | Hayakawa | G10L 17/14 704/249 |
| 2008/0195387 | A1* | 8/2008 | Zigel | G10L 17/06 704/236 |
| 2009/0083850 | A1* | 3/2009 | Fadell | G06F 21/316 726/19 |
| 2010/0004931 | A1* | 1/2010 | Ma | G10L 15/08 704/244 |
| 2010/0179813 | A1* | 7/2010 | Summerfield | G10L 17/14 704/246 |
| 2012/0130714 | A1* | 5/2012 | Zeljkovic | G10L 17/24 704/235 |
| 2012/0136655 | A1* | 5/2012 | Yamabe | G10L 25/90 704/207 |
| 2012/0173239 | A1 | 7/2012 | Sanchez Asenjo et al. | |
| 2013/0225128 | A1 | 8/2013 | Gomar | |
| 2014/0081638 | A1 | 3/2014 | Lopez et al. | |

FOREIGN PATENT DOCUMENTS

| | | |
|---|---|---|
| WO | WO-2010066269 A1 | 6/2010 |
| WO | WO-2010066310 A1 | 6/2010 |
| WO | WO-2010066435 A1 | 6/2010 |

OTHER PUBLICATIONS

Villalba et al., "Speaker Verification Performance Degradation against Spoofing and Tampering Attack," FALA 2010, VI Jornadas en Tecnologia del Habla and II Iberia SL Tech Workshop, pp. 131-134.
Hautamäki et al., "I-vectors meet imitator: on vulnerability of speaker verification systems against voice mimicry," School of Computing, University of Easter Finland, Joensuu, Finland, Speech and Voice Research Laboratory, School of Education, University of Tampere, Finland.
Gomez-Barrero et al., "Security Evaluation of i-Vector Based Speaker Verification Systems Against Hill-Climbing Attacks," ATVS Biometric Recognition Group, C/Francisco Tomas y Valiente 11, Universidad Autonoma de Madrid, 28049, Spain.
Wu et al., "Voice Conversion and Spoofing Attack on Speaker Verification Systems," Nanyang Technological University, Singapore and Institute for Infocomm Research, Singapore.
De Leon et al., "Synthetic Speech Discrimination Using Pitch Pattern Statistics Derived from Image Analysis," New Mexico State University, Klipsch School of Elect. and Comp. Eng., Las Cruces, N.M., University of Edinburgh, Centre for Speech Technology Research (CSTR), Edinburgh, U.K.
Wu et al., "Detecting Converted Speech and Natural Speech for Anti-Spoofing Attack in Speaker Recognition," School of Computer Engineering, Nanyang Technological University, Singapore, Human Language Technology Department, Institute for Infocomm Research, Singapore, School of EE & Telecom, University of New South Wales, Australia.
Evans et al., "Spoofing and Countermeasures for Automatic Speaker Verification," EURECOM, Sophia Antipolis France, University of Easter Finland, Finland, University of Edinburg, UK, National Institute of Informatics, Japan, INTERSPEECH 2013, ISCA, pp. 925-929.
Villalba et al., "Detecting Replay Attack from Far-Field Recordings on Speaker Verification Systems," Communications Technology Group (GTC), Aragon Institute for Engineering Research (I3A), University of Zaragoza, Spain.
De Leon et al., "Evaluation of the Vulnerability of Speaker Verification to Synthetic Speech," Odyssey 2010, The Speaker and Language Recognition Workshop, Jun. 28-Jul. 1, 2010, Czech Republic, pp. 151-158.
Alegre et al., "Spoofing Countermeasures for the Protecting of Automatic Speaker Recognition from Attacks with Artificial Signals," Multimedia Communications Department, EUROCOM, Sophia Antipolis, France.
Jin et al., "Is Voice Transformation a Threat to Speaker Identification?," IEEE 2008, Language Technologies Institute, Carnegie Mellon University, pp. 4845-4848.
Wu et al., "A Study on Spoofing Attack in State-of-the-Art Speaker Verification: The Telephone Speech Case," School of Computer Engineering, Temasek Laboratories NTU, School of Computing, Human Language Technology Department, School of Electrical Engineering and Telecommunication.
Kinnunen et al., "Vulnerability of Speaker Verification Systems Against Voice Conversion Spoofing Attacks: The Case of Telephone Speech," School of Computing, University of Eastern Finland, School of Computer Engineering, Nanyang Techonological University, Human Language Technology Department, Institute for Infocomm Research.
Wu et al., "Vulnerability Evaluation of Speaker Verification Under Voice Conversion Spoofing: The Effect of Text Constraints," School of Computer Engineering, Nanyang Technologies University Temasek Laboratories, Nanyang Technologies University Human Language Technology Department, Institute for Inforcomm Research, School of Computing, University of Eastern Finland.
European Search Report for Application No. 14186220.1, dated Mar. 17, 2015.
F. Alegre et al. "Spoofing countermeasures for the protection of automatic speaker recognition from attacks with artificial signals", published in "INTERSPEECH 2012, 13th Annual Conference of the International Speech Communication Association, (2012)" hal-00783789, version 1—Feb. 1, 2013.
F. Alegre, et al. "Spoofing Countermeasures to Protect Automatic Speaker Verification from Voice Conversion" published in "ICASSP 2013, 38th IEEE International Conference on Acoustics, Speech, and Signal Processing. (2013)" hal-00804543. version 1—Mar. 25, 2013.
J. Villalba et al. "Speaker Verification Performance Degradation against Spoofing and Tampering Attacks", In Proceedings of FALA 2010.
J. Villalba et al. "Detecting Replay Attacks from Far-Field Recordings on Speaker Verification Systems" Communication Technology Group (GTC), Aragon Institute for Engineering Research (I3A), University of Zaragoza, Spain.
Z. Wu et al. INTERSPEECH 2013, "Vulnerability evaluation of speaker verification under voice conversion spoofing: the effect of text constraints" Copyright © 2013 ISCA, Aug. 25-29, 2013, Lyon, France.

(56) References Cited

OTHER PUBLICATIONS

F. Alegre et al. INTERSPEECH 2013, "A new speaker verification spoofing countermeasure based on local binary patterns" Copyright © 2013 ISCA Aug. 25-29, 2013, Lyon, France.
R. Hautamaki et al. INTERSPEECH 2013, "I-vectors meet imitators: on vulnerability of speaker verification systems against voice mimicry" Copyright © 2013 ISCA, Aug. 25-29, 2013, Lyon, France.
M. Barrero et al. INTERSPEECH 2013, "Security Evaluation of i-Vector Based Speaker Verification Systems Against Hill-Climbing Attacks" Copyright © 2013 ISCA, Aug. 25-29, 2013, Lyon, France.
N. Evans et al. INTERSPEECH 2013, "Spoofing and countermeasures for automatic speaker verification" Copyright © 2013 ISCA, Aug. 25-29, 2013, Lyon, France.
Z. Kons et al. INTERSPEECH 2013, "Voice Transformation-based Spoofing of Text-Dependent Speaker Verification Systems" IBM Research—Haifa, Haifa, Israel, Copyright © 2013 ISCA, Aug. 25-29, 2013, Lyon, France.
R. Togneri et al. "An Overview of Speaker Identification: Accuracy and Robustness Issues", IEEE Circuits and Systems Maganzine, vol. 11, No. 2, Jan. 1, 2011 (Jan. 1, 2011), pp. 23-61.
Villalba and E, Lleida J: "Detecting Replay Attacks from Far-Field Recordings on Speaker Verification Systems", Biometrics and ID Management: Cost 2101 International Workshop, vol. 6583, Mar. 8, 2011 (Mar. 8, 2011), pp. 274-285.
Douglas A, Reynolds: "Automatic Speaker Recognition Using Gaussian Mixture Speaker Models" The Lincoln Laboratory Journal, vol. 8, No. 2, Jan. 1, 1995 (Jan. 1, 1195), pp. 173-192.
European Search Report for Application No. 13185783.1 dated Jan. 8, 2014.
Togneri, Robert et al., An Overview of Speaker Identification Accuracy and Robustness Issues, IEEE Circuits and Systems Magazine, IEEE Service Center, New York, NY, US, vol. 11, No. 2, Jan. 1, 2011, pp. 23-61.
Villalba and Lleida, Detecting Replay Attacks from Far-Field Recordings on Speaker Verification Systems, Biometrics and ID Management: Cost 2101 International Workshop, BIOID 2011,Brandenburg, Germany, vol. 6583, Mar. 8, 2011, pp. 274-285.
Reynolds, Douglas A., Automatic Speaker Recognition Using Gaussian Mixture Speaker Models, The Lincoln Laboratory Journal, vol. 8, No. 2, Jan. 1, 1995, pp. 173-192.
European Search Report, Application No. EP13185783, Dec. 19, 2013.
Communication pursuant to Article 94(3) EPC, Application No. EP14186220.1, mailed Feb. 28, 2017.

* cited by examiner

ANTI-SPOOFING

CROSS-REFERENCE TO RELATED APPLICATION

The present application is a continuation-in-part of U.S. patent application Ser. No. 14/083,942, filed Nov. 19, 2013, which claimed priority to European Application No. 13185783.1, filed Sep. 24, 2013. The entire text of U.S. patent application Ser. No. 14/083,942 and European Patent Application No. 13185783.1 are incorporated herein by reference.

FIELD OF THE DISCLOSURE

The invention relates to a system for classifying whether audio data received in a speaker recognition system is genuine or a spoof.

BACKGROUND

Speaker recognition systems usually perform well when no malicious intention is used by people using said speaker recognition. However, several different possible ways to attack speaker recognition systems with a malicious intention are known.

They comprise for example synthesized attacks or non-synthesized attacks. Synthesized attacks comprise for example text-to-speech attacks generating the corresponding audio data by adapting the voice to a certain speaker. For the text-to-speech attacks, Hidden Markov Models may be used. Synthesized attacks also comprise for example audio data generated by voice conversion algorithms that may be used to create artificial signals mimicking a certain speaker. Non-synthesized attacks comprise for example recording attacks, e.g. far field recording attacks, where utterances of a certain speaker are recorded by a far field microphone. Then, the recording may be used directly or from this recording a pass phrase may be extracted, for example, by cut and paste approaches. Non-synthesized attacks also comprise the imitation of a certain speaker by an imposter changing one or more parameters of the voice to adapt to the characteristics of the speaker to be imitated. For example, document "Speaker Verification Performance Degradation against Spoofing and Tampering Attacks" by J. Villalba and E. Lleida published in Proceedings of FALA 2010 or document "Spoofing and Countermeasures for Automatic Speaker Verification" by ] N. Evans, T. Kinnunen, J. Yamagishi in Proceedings of Interspeech 2013, provides further information on such attacks.

Any such attacks are called spoofs. If they are based on audio data being replayed using a loud speaker, they are also called replay attacks. Such attacks may also be based on inserting the information directly into the speaker recognition system (direct injection).

Although there are approaches in the prior art to detect certain types of spoofs like replay attacks, for example, using support vector machine based approaches e.g. in "Detecting Replay Attacks from Far-Field Recordings on Speaker Verification Systems" by J. Villalba and E. Lleida published in Proceedings of Biometrics and ID Management-COST 2101 European Workshop, Bio ID 2011, these often work only for certain types of spoofs and/or adaptation to new conditions is not allowed.

DETAILED DESCRIPTION OF THE PREFERRED EMBODIMENTS

The invention is related to providing an improved system for classifying whether audio data received in a speaker recognition system is genuine or a spoof.

Typically, high degradation of the audio signal data results when a person impersonates another person ("spoof") using a technique like voice transformation, or recording of a victim (e.g. replay attack). In particular, high degradation may mean that the degradation is higher than degradation present in a genuine audio signal. This is an example of what may be meant by the expression "spoof" in this application.

The invention comprises a system for classifying whether audio data received in a speaker recognition system is genuine or a spoof. In such a system, a Gaussian classifier is used.

Herein, audio data usually corresponds to or comprises an audio data file or two, three, four or more audio data files.

A system according to the invention may be used in combination with different types of speaker recognition systems or be comprised in different types of speaker recognition systems.

A system according to the invention is in particular a system adapted to classify whether audio data received in a speaker recognition system is genuine or a spoof using a Gaussian classifier. A system according to the invention may be adapted to be used exclusively to determine if received audio data is genuine or a spoof.

It may for example, be used in combination with or be comprised in a speaker verification system, wherein the focus of the speaker recognition is to confirm or refuse that a person is who he/she says to be. In speaker verification, two voice prints are compared, one of the speaker known to the system in advance (e.g. from previous enrollment) and another extracted from the received audio data. A system according to the invention may alternatively or additionally be used in combination with or be comprised in a speaker identification system. In speaker identification, the system comprises or has access to voice prints from a set of N known speakers and has to determine which of these known speakers the person who is speaking corresponds to. The voice print extracted from the received audio data is compared against all N voice prints known to the system (e.g. from previous enrollment(s)). A speaker identification system can be open-set, wherein the speaker is not necessarily one of the N speakers known to the system, or closed-set, if the speaker is always in the set of speakers known to the system. The term speaker recognition comprises both speaker verification and speaker identification.

A system according to the invention may also be used in combination with or be comprised in a speaker recognition system (speaker verification and/or speaker identification) which is text-dependent, meaning that the same lexical content (e.g. a passphrase) has to be spoken by a speaker during enrollment and during recognition phases or in a text-independent system, wherein there is no constraint with regard to the lexical content used for enrollment and recognition.

A system according to the invention may be a passive system, meaning that no additional audio data may be needed once the audio data to be classified is received.

In a system according to the invention, a Gaussian classifier is used. This means that the classification is based on a model described by 1, 2, 3, 4, or more Gaussian probability density functions (Gaussians).

In particular, in a system according the invention, 1, 2, 3, 4, or more Gaussians may be used to model the spoof region of audio data parameters. Additionally or alternatively, 1, 2, 3, 4, or more Gaussians may be used to model the genuine region of audio data parameters. The spoof region of audio data parameters may e.g. be modeled by a Gaussian Mixture Model (GMM) and/or the genuine region of the audio data parameters may be modeled by a GMM.

A Gaussian mixture model may comprise C Gaussians, wherein C may be 1, 2, 3, 4 or more. Each Gaussian comprised in a Gaussian mixture model is called a component. These components are indicated by c.

The Gaussian classifier may be a full-covariance Gaussian classifier, e.g. a Gaussian classifier in which each Gaussian is described including a full covariance. In other embodiments, less than a full-covariance Gaussian classifier may be used, e.g. a diagonal covariance Gaussian classifier may be used.

$C_{spoof}$ may indicate that the number of Gaussians in the Gaussian mixture model describing the spoof region of parameters describing audio data, $C_{non-spoof}$ may be the number of Gaussians (components) in the Gaussian mixture model describing the genuine (non-spoof) audio data.

Each component of such a model describing the (non-)spoof region of parameters describing audio data may be denoted by $c_{(non-)spoof}$. When using the expression c in the text, this may refer to $c_{spoof}$ and/or $c_{non-spoof}$ and may also be written as $c_{(non-)spoof}$. The same notation may also be used for other expressions, e.g. C, w, etc.

The above-mentioned case wherein the spoof region of parameters describing audio data is described by one Gaussian and/or wherein the non-spoof region of parameters describing audio data is described by one Gaussian may be particularly suitable for cases where the audio data is not sufficient to create a more complex model. It is a special case of the Gaussian mixture model wherein $C_{(non-)spoof}=1$.

Although $C_{spoof}$ and $C_{non-spoof}$ may have different values in general, they may have the same value in some embodiments $C_{spoof}=C_{non-spoof}$ because that way the likelihoods given by the spoof and non-spoof model may be more easily comparable. $C_{spoof}$ and/or $C_{non-spoof}$ may be 1 in some embodiments.

$C_{spoof}$ and/or $C_{non-spoof}$ may each be 1, 2, 3, 4 or more, as indicated previously.

In a system according the invention, the audio data parameters which may be considered may comprise a spectral ratio. The spectral ratio may for example be the ratio between the signal energy from 0-2 KHz and from 2-4 KHz or the ratio of the signal energies in two other spectral ranges.

For the spectral ratio being the ratio of the signal energy from energy from 0-2 KHz and from 2-4 KHz, given a frame l of the audio data x(t), the spectral ratio for frame l may for example be calculated as:

$$SR(l) = \sum_{f=0}^{\frac{NFFT}{2}-1} 20\log_{10}(|X(f,l)|)\sqrt{\frac{4}{NFFT}} \cos\left(\frac{(2f+1)\pi}{NFFT}\right) \quad (1)$$

Herein, X (f, l) is the Fast Fourier Transform (FFT) of the frame l of the audio data x(t), and NFFT is the number of points of the FFT. NFFT may for example be 256, or 512 or another suitable number. l may lie between 1 and L, L being the total number of (speech) frames present in the audio data x. Optionally, the spectral ration may only be calculated for speech frames (explained further below).

A frame of audio data refers to a (usually small) part of the audio data. For example, audio data, e.g. an audio data file, may be cut up into separate parts, wherein each part corresponds to a certain time interval of the audio data, e.g. 10 ms or 20 ms. Then, each of those parts is a frame of the audio signal. A frame of an audio data may e.g. be created by considering a window with a window length of a certain time, e.g. 20 ms, with a shift of a certain time, e.g. 10 ms.

The average value of the spectral ratios $SR_{audio}$ may then be calculated. It may e.g. be calculated as the mean of the spectral ratios of all speech frames, which may be defined as frames of which the modulation index is above a given threshold, which may for example be 0.5, 0.75 or 0.9. This modulation index may be used as a complement to or as an alternative to a Voice Activity Detector (VAD). The modulation index is a metric that may help or enable one to determine if the analyzed frame is a conventional speech frame. The modulation index at a time t may be calculates as $$Idx(t) = \frac{v_{max}(t) - v_{min}(t)}{v_{max}(t) + v_{min}(t)} \quad (2)$$

where v(t) is the envelope of the signal x(t) and $v_{max}$ (t) and $v_{min}$ (t) are the local maximum and minimum of the envelope in the close surrounding to the t time stamp. The envelope may e.g. be approximated by the soluble absolute value of the signal x(t) downsampled to 60 Hz.

Another parameter of the audio data which may be considered in a system according to the invention in addition or alternatively to the spectral ratio is the feature vector distance.

A feature vector distance may be computed relative to parameters describing average feature vectors of genuine audio data.

The audio data from which average feature vectors may be calculated may e.g. be audio data which is known to the speaker recognition system and/or the system according to the invention, typically from a previous enrollment. For example, the feature vector distance may be computed relative to parameters describing average feature vectors of audio data used for the enrollment of one, two or more speakers for the speaker recognition system.

For example, in a system according to the invention used in combination with or comprised in a speaker verification system, the feature vector distance may be calculated relative to parameters describing average feature vectors of the enrollment audio data of the speaker who is to be verified. As a different example, in a system according to the invention used in combination with or comprised in a speaker identification system, the feature vector distance may be calculated relative to parameters describing average feature vectors of the enrollment audio data, e.g. audio data of 1, 2, 3, four, more than four or all N speakers known to the speaker identification system.

One or more or all of the parameters describing average feature vectors of audio data may be given by a constant value, which may e.g. be provided in the system according to the invention or by a third party and/or they may be transferred from a speaker recognition system, e.g. over an interface and/or they may be calculated in a system according to the invention e.g. from enrollment audio data, e.g. as previously described.

If the parameters describing average feature vectors of audio data are calculated in a system according to the invention, D dimensional Mel Frequency Cepstral Coefficients MFCCs are one possible option to describe feature vectors of audio data. Thus, average feature vectors of audio data may e.g. be calculated by calculating the mean $\mu_{mfcc,d}$ of D dimensional MFCCs in one, two, three, or more or each dimension d∈[1; D] and/or calculating a standard deviation $\sigma_{mfcc,d}$ thereof for one, two, three or more or each dimension d∈[1; D] over the considered audio data and over time, optionally taking into account only those parts of the considered audio data comprising voice signals, e.g. as explained in the following. D may e.g. be fixed heuristically, and may e.g. be a number from 5-30, e.g. from 7-25, e.g. from 9-20.

In particular, D dimensional MFCCs may be extracted from each of the considered audio data files (e.g. enrollment audio data files).

In that manner, for each audio data file j∈[1;J] of the considered audio data a sequence of MFCCs: $mfcc_{j,t,d}$ may be extracted. Herein J is the number of the considered audio data files, t is the frame index with a value between 1 and $T_j$ (t∈[1;$T_j$]), wherein $T_j$ is the total number of (speech) frames for audio data file j. Optionally, only those parts of the audio data file j comprising voice signals are taken into account for extracting the MFCCs, e.g. by using a Voice Activity Detector (VAD). d is a value between 1 and D (d∈[1;D]) representing the considered dimension.

In some exemplary embodiments of systems according to the invention, no feature normalization is be used when extracting the MFCCs.

From the sequence of MFCC's, the mean along t may be computed as $$\mu_{mfcc,j,d} = \frac{1}{T_j}\sum_{t=1}^{T_j} mfcc_{j,t,d} \quad (3)$$

Given J data files, from each of the J data files D dimensional MFCCs $C_1, C_2, \ldots C_D$ may be extracted as previously mentioned. Then, the mean $\mu_{mfcc,d}$ and the standard deviation $\sigma_{mfcc,d}$ over all J data files may be calculated e.g. as indicated in the following.

$$\mu_{mfcc,d} = \frac{1}{J}\sum_{j=1}^{J} \mu_{mfcc,j,d} \quad (4)$$

$$\sigma^2_{mfcc,d} = \frac{1}{J-1}\sum_{j=1}^{J} (\mu_{mffc,j,d} - \mu_{mffc,d})^2. \quad (5)$$

In some embodiments of a system according to the invention, the mean of the MFCCs in one, two, three, more or each dimension d of the D dimensions and/or the standard deviation(s) of the mean of the MFCCs in one, two, three or more or all d of the D dimensions may, instead of being calculated, be a given constant value, which may e.g. be provided in the system according to the invention or by a third party and/or they may be transferred from a speaker recognition system, e.g. over an interface.

The feature vector distance may be determined by determining an absolute value of the difference between the parameters describing the audio data received in the speaker recognition system which is to be classified from the parameters describing average feature vectors of audio data.

When MFCCs are used to describe the feature vectors, the feature vector distance of the audio data file may be calculated using the MFCCs. It may for example be found by first calculating the mean of the MFCCs of the received audio data $\mu_{mfcc,audio,d}$ in each dimension d, e.g. as $$\mu_{mfcc,audio,d} = \frac{1}{T_{audio}}\sum_{t=1}^{T_{audio}} mfcc_{audio,t,d}. \quad (6)$$

Herein, $T_{audio}$ corresponds to the number of speech frames (e.g. found by using a VAD) of the received audio data optionally taking into account only those parts of the received audio data comprising voice signals.

Then, the feature vector distance $\Delta_{audio}$ of the received audio data may be determined by summing up over all dimensions d∈[1; D] the absolute value of the difference between the mean value $\mu_{mfcc,d}$ (4) of the MFCCs in dimension d and the mean of the MFCCs $\mu_{mfcc,audio,d}$ (6) of the received audio data in the dimension d divided by the standard deviation $\sigma_{mfcc,d}$ (5) of the mean MFCCs in dimension d, e.g. as follows:

$$\Delta_{audio} = \sum_{d=1}^{D} \frac{|\mu_{mfcc,d} - \mu_{mfcc,audio,d}|}{\sigma_{mfcc,d}}. \quad (7)$$

A system according to the invention may use 1, 2, 3, 4 or more parameters describing the audio data as parameters to classify whether audio data received in a speaker recognition system is genuine or a spoof.

In a system according to the invention, the two previously discussed parameters of the audio data, namely, a spectral ratio and a feature vector distance, may be the only parameters used for classifying whether an audio data received in a speaker recognition system is genuine or a spoof. In other embodiments of the system according to the invention, there may in addition, or alternatively to one or both of these parameters, be one, two, three or more different parameters also describing the audio data. The parameters describing the audio data may be written in a vector having as many dimensions as there are parameters which are considered in a model for describing the audio data (the spoof region of audio data parameters and the genuine region of audio data parameters).

In embodiments wherein a feature vector distance and a spectral ratio are the only parameters describing the audio data received in the speaker recognition system, each audio data file may for example be represented by a two-dimensional vector $$y_{audio} = \begin{pmatrix} \Delta_{audio} \\ SR_{audio} \end{pmatrix}. \quad (8)$$

In other embodiments, this vector may have as many dimensions as there are parameters of the audio data. For example, it may have more dimensions than 2 or less dimensions than 2 or may have 2 dimensions, but different variables than in the previously mentioned embodiment.

For example, in other embodiments, in addition or alternatively to one or more of the above-mentioned parameters describing the audio data, Low Frequency Mel Frequency Cepstral Coefficients (in the following also referred to as LF-MFCC) and/or Medium Frequency Relative Energy (MF) may be used.

For example, the audio data parameters which may be considered may comprise a medium frequency relative energy (MF). MF is the ratio between the energy of a signal from a certain frequency band ($f_a$, $f_b$) and the energy of the complete frequency spectrum of the signal.

MF may in some embodiments be or represent a ratio along the frames of the energy of a filtered audio and the energy of the complete audio.

In calculating MF, the filter may be built to maintain certain (relevant) frequency components of the signal. The relevant frequency components may be selected according to the spoof data which should be detected (e.g. according to the frequency characteristics of loudspeakers which are typically used for spoof in replay or other attacks, e.g. by taking into consideration certain frequency ranges which are typical for such loudspeakers). Such a selection may e.g. be made based on training or develop data, e.g. samples of spoof audio data.

MF may be extracted by filtering the audio signal x(n) (herein, x(n) may correspond to an audio signal which has previously been written as x(t), t being the time. However, as t is used as frame index in the following calculations, the audio signal may in the following paragraphs and FIG. 2 also be referred to as x(n), with n referring to the particular sample. x(n) (as x(t)) is typically in the time domain) with a band pass filter (e.g. a narrow band pass filter) to extract the frequency components of the desired band ($f_a$, $f_b$), thus for example generating data referred to as y(n).

Then, both the initial audio signal x(n) and the filtered version y(n) may be windowed (e.g. using Hamming windowing), thus for example generating data referred to $x_t(n)$ (for the audio signal) and $y_t(n)$ (filtered audio signal) for the t-th frame (t=1, 2, 3, 4, ... T, wherein T is the number of frames of the audio).

Then, a value indicative of the energy corresponding to a window t may be computed as $$e_y(t) = \max(10 \log_{10}(\Sigma_n (y_t(n))^2), -150), \quad (9)$$

$$e_x(t) = \max(10 \log_{10}(\Sigma_n (x_t(n))^2), -150), \quad (10)$$

and the average ratio of the values indicative of the energy corresponding to a window may be computed as $$MF = \frac{1}{M} \sum_m (e_x(m) - e_y(m)). \quad (11)$$

(As a logarithm has been used in equations (9) and (10), such a ratio may be calculated by subtracting the two values indicative of the energy corresponding to a window m.) Herein, in some embodiments only those M frames (wherein m lies between 1 and M (e.g. m=1, 2, 3, ... M), in the previous expression) may be considered for which for example $e_x(m) > \max_t(e_x(t)) - 50$, or, in other words, such that the average is estimated with the frames with highest energy (e.g. an energy higher than a certain threshold) for $x_t(n)$. Other thresholds than the one mentioned above may also be used. In other embodiments, all frames may be considered when calculating MF (e.g. M=T).

The narrow-band pass filter (band pass filter) can be designed in many different ways.

In one embodiment a Cauer approximation may be used with a lower stop frequency of $f_a - \gamma_a$ and a lower pass frequency of $f_a$ with a minimum attenuation in the lower stop band of $\phi_{ls}$. In the higher stop frequency, the minimum attenuation may be $\phi_{hs}$ with the higher pass frequency located at $f_b - \gamma_b$ and the higher stop frequency at $f_b$. These variables may depend on the properties of the replaying loudspeakers that are to be detected and/or the available resources to evaluate the bandpass filter. For example, $f_a$ may be approximately 100 Hz, for example between 50 and 150 Hz, $\gamma_a$ may be approximately 20 Hz, for example between 10 Hz and 30 Hz, $\phi_{ls}$ may be approximately 60 dB, for example between 50 dB and 70 dB, $\phi_{hs}$ may be approximately 80 dB, for example between 70 dB and 90 dB, $f_b$ may be approximately 200 Hz, for example between 150 Hz and 250 Hz and $\gamma_b$ may be approximately 20 Hz, for example between 10 Hz and 30 Hz.

For example, the audio data parameters which may be considered may alternatively or additionally comprise LF-MFCC. LF-MFCC may be designed to represent a kind of energy ratios of the envelope of the spectrum of an input signal, but only in a (low-) frequency region between two frequencies $f_d$ and $f_u$.

In the computation of MF and/or LF-MFCC, for example, Cauer filters (a Cauer approximation) may be used to extract relevant frequency information. The nomenclature between MF and LF-MFCC is typically different because the filters may be different.

As is known to a person skilled in the art, a Cauer approximation is a way to build signal processing filters. Given a frequency band (band pass) to be preserved, the minimum attenuation for the non-pass band(s) and the frequency range or band to get the desired minimum attenuation have to be defined. The desired minimum attenuation can usually not be obtained at a frequency of 0 Hz (infinite slope). Usually, the higher the minimum attenuation and the lower the frequency band(s) or range(s), the more complex the filter is and the more time is needed to run the algorithm. For example, for a band pass between $f_d$ and $f_u$, the frequency band or range to get the desired minimum attenuation for lower non-pass band is typically $f_d - \gamma_d$ to $f_d$, the frequency band or range to get the desired attenuation for the higher non-pass band is from $f_u - \gamma_u$ to $f_u$, and the minimum attenuation for lower non-pass band (from 0 Hz to $f_d - \gamma_d$) is $\phi_{ls}$ while the minimum attenuation for the higher non-pass band (from $f_u$ to infinity) is $\phi_{hs}$.

In a Cauer solution to extract LF-MFCC, the lower stop frequency may be $f_d - \gamma_d$ and the lower pass frequency may be $f_d$ with a minimum attenuation in the lower stop band of $\phi_{ls}$. In the higher stop frequency, the minimum attenuation may be $\phi_{hs}$ with the higher pass frequency located at $f_u - \gamma_u$ and the higher stop frequency at $f_u$.

These variables may for example be determined depending on the properties of the loudspeakers that is to be detected when used in a replay attack and/or the available resources for evaluating the band pass filter.

In other embodiments, the band pass filter may be a low pass filter with $f_d = 0$ Hz $= \gamma_d$.

$f_u$ may for example have a value of about 500 Hz, for example between 250 Hz and 750 Hz.

Defining $\phi_{ls}$ may not be necessary when using such a low pass filter, $\phi_{hs}$ may have value of approximately 80 dB, for example between 60 dB and 100 dB, and $\gamma_u$ may have value of approximately 20 Hz, for example between 10 Hz and 30 Hz.

Typically, LF-MFCC may be found by applying the above-mentioned band pass filter to the audio data x(n) (the audio signal).

Then, the obtained result of the band pass filter (which may be described as y(n)) may optionally be downsampled (to be described by $y_d(n)$), meaning for example that the filtered signal may be compressed, such that less information needs to be processed. The rate which can be used for the downsampling without loss of (relevant) information typically depends on $f_u$ and/or the frequency rate of the audio signal.

For example, given a sample frequency ($f_m$) used to record an audio signal, the maximum frequency component of the audio is typically $f_m/2$. If the signal is filtered (e.g. with a low pass filter), and the higher stop frequency is $f_u$, one sample per floor ($f_m/2f_u$) is typically sufficient in order to have all the relevant information (lose no information after filtering). Herein, floor () is the integer part of .

For example, for an audio recorded at approximately 8 kHz and $f_u$=500 Hz, the filtered signal may be reduced by a factor 8 without loss of information, thus reducing the time necessary for computing drastically.

After the optional downsampling (or in some embodiments directly after the band pass filter), a pre-emphasis filter may optionally be applied to flatten the speech signal spectrum compensating an inherent tilt due to radiation phenomenon along with the glottal pulse spectral decay. Such pre-emphasis filter may for example correspond to the ones known from traditional speech front-ends or be different. (An exemplary description of what may be meant by downsampling in some embodiments can for example be found in "Discrete-Time Signal Processing" ($2^{nd}$ edition) Prentice Hall, by Openheim, Alan v; Schafer, Ronald W.; Buck, John. R.)

For example, as a pre-emphasis filter a first order high pass FIR filter with a coefficient $\zeta$ may be used. It has been found that a value of approximately 0.87 for $\zeta$ has a good discrimination between spoof and non-spoof audios. For example, $\zeta$ may for example be between 0.77 and 0.97, for example between 0.82 and 0.92.

Thus, a filtered portion of the previous signal (e.g. $y_d(n)$) is typically extracted (which may e.g. be referred to as z(n)).

Then, the signal may be windowed, for example using a Hamming window with a length of approximately 320 ms and approximately 50% overlap, for example a length between 220 and 420 ms and between 25% and 75% overlap. Thus, for each frame t (window) thus a value $z_t(n)$ is obtained. Because the frequency band under analysis is typically quite low, usually longer periods than the ones usually considered in speech technology solutions (e.g. 20 ms) are typically considered.

The values obtained by the windowing $z_t(n)$ may then be further processed, e.g. to extract an estimation of the spectrum (power spectral density). This may, for example, be done by a Fast Fourier Transformation (FFT) and determination of the absolute value of $z_t(n)$, thus obtaining a value $Z_t(k)$. Herein, FFT($z_t(n)$) is typically a complex signal, so that the absolute value |FFT($z_t(n)$)|=$Z_t(k)$ may be extracted in some embodiments. Herein, k typically represents the frequency domain. (Typically, non-parametric methods which may be used for estimation of the spectrum (estimation of the power spectral density) like a periodogram or the Welch method rely on FFT). In other embodiments, an estimation of the spectrum may be extracted with other methods, such as parametric solutions, e.g. using Auto Regressive (AR) modeling and/or linear prediction analysis. In such parametric methods, the information is typically embedded in the AR coefficients. Thus, linear prediction coefficients and/or the derived estimate of the power spectral density of the signal under analysis may be used as estimation of the spectrum.

With regard to how spectral estimation may be carried out, reference is also made to Kay, S. M. Modern Spectral Estimation: Theory and Application. Englewood Cliffs, N.J.: Prentice-Hall, 1988.

Then, spectral smoothing may optionally be applied. This may for example be done in accordance with the methods used by current speech front-ends that try to extract the short-term representation of the spectral envelope for each frame using some kind of smoothing of the raw spectral measurements with non-linear operations. This may for example be done as it has been done traditionally, namely to remove the harmonic structure of speech corresponding to pitch information and to reduce the variance of the spectral envelope estimation. In addition to this, the number of parameters representing each frame spectrum may also be reduced by this.

This spectral smoothing may for example be performed by means of a bank of filters operating in the frequency domain by computing a weighted average of the magnitude of the absolute values of the FFT for each audio window, thus rendering $G_t(m)$. The number of filters and the bandwidth of each filter may be similar or varied with regard to the conventional ones used in speech technology in order to obtain higher resolution in the representation of the frequency band which showed to be more discriminative to classify spoof and non-spoof data. The number of filters and/or the bandwidth of each filter may e.g. be determined based on $f_u$. Traditionally, for example a 20/24 filter structure may be used in speech technology, while in other embodiment of this invention, the number of filters may be approximately 80, for example between 70 and 90. For example, spectral smoothing may be done by Mel filtering. After the MEL filtering the log of each coefficient m may be taken. (Herein, Mel filtering typically consists of or comprises building a set of filters using the Mel scale and applying them to the signal (e.g. the absolute value of the FFT of the audio signal (one frame)). Mel filters are typically triangular. Reference in this regard is also made to MFCCs, and S. B. Davis, and P. Mermelstein: "Comparison of Parametric Representations for Monosyllabic Word Recognition in Continuously Spoken Sentences", (1980) in IEEE Transactions on Acousitcs, Speech and Signal Processing, 28(4), pp. 357-366.)

The number of MEL filters may depend on the degree of smoothness intended for the embodiment. For example, if $f_u$=500 Hz and a lot of filters are built, the resolution of the filtered signal $G_t(m)$ is typically very high, but also very noisy. If very few (fewer than in the comparison case) filters are built, the resolution of $G_t(m)$ is usually poor (e.g. poorer as in the case with many filters), but it is not as noisy (as e.g. in the case of a high resolution filtered signal $G_t(m)$). The bandwidth of the filters may for example depend on the ration between $f_u$ and the number of filters: the higher the ratio, the higher the bandwidth.

After the optional spectral smoothing, a Discrete Cosine Transformation (DCT) may be used, which is a well known linear transformation which is popular due to its beneficial properties that may e.g. allow compact and decorrelated representations. With such a DCT LF-MFCC$_t$(r) may be extracted from $G_t(m)$. The number R of LF-MFCC$_t$(r) (r∈[1,R]) may not be the same as the number M of coefficients of $G_t(m)$ (m∈[1,M]). In other embodiments, the numbers R and M may be the same. The output of the DCT module may for example be seen as a compact and systematic way to generate energy ratios.

Given one audio and one frame (t), for example, O coefficients may be generated (which may typically be relevant): LF-MFCC$_{t,o}$ (o∈[1,O]). Herein, O may be 1, 2, 3, 4 or more, for example typically e.g. 3, e.g. between 2 and 4). LF-MFCC$_o$ may then be computed by averaging the LF-MFCC$_{t,o}$, for example for some or all speech frames.

Herein, a speech frame may for example be determined using a conventional voice activity detector. In other embodiments, a particular coefficient LF-MFCC$_{t,0}$ (LF-MFCC$_{t,zero}$) may be considered as an energy estimation of each frame, so that only those frames may be selected as speech frames which have the highest estimated energy (e.g. the 10% of the frames with highest energy, or the 50% of the frames with highest energy, or all frames with an energy above a certain value).

Typically, calculating LF-MFCC is a systematic and compact way to calculate energy ratios. (In the above-mentioned example, to compute LF-MFCC, a low pass filter may be used so that all the energy ratios are focused in a low frequency band. In some embodiments, without applying DCT, the output of LF-MFCC for a given frame would be a smooth version of the frequency spectrum in a log domain e.g. when computed by the FFT, absolute value, Mel filtering and log. After an optional DCT is computed, which typically uses a cosine base (with different frequencies), multiplying the cosine base with the smooth version of the spectrum, each frequency of the cosine basis which represents a coefficient of the LF-MFCC, is an energy ratio: Some of the log energy spectrum energies (log spectrum bins) may be multiplied by positive values and some of the log spectrum entries (log spectrum bins) may be multiplied by negative values and at the end all the multiplied log energies may be added to generate the corresponding LF-MFCC.) Since, for example, some spoofs (e.g. replay attacks) are built with loudspeakers, the relevant energy ratios to detect the spoof audios typically depend on the frequency response of the loudspeakers. Because of that, some LF-MFCC coefficients (relevant coefficients) may be more discriminative than others in order to detect a certain loudspeaker, e.g. a replay attack.

Thus, the O coefficients (or parts thereof) (which may e.g. comprised in the parameters describing the audio data) may be selected, e.g. with develop data (e.g. from known loudspeakers which may be used in replay attacks) or a priori knowledge, or to build an anti-spoofing solution adapted for a wide range of loudspeakers. For such applications, O may e.g. be 1, 2 or 3.

For example, the O LF-MFCC coefficients may be selected according to the spoof data which should be detected (e.g. according to the frequency characteristics of loudspeakers which are typically used for spoof in replay or other attacks, e.g. by taking into consideration certain frequency ranges which are typical for such loudspeakers). Such a selection may e.g. be made based on training or develop data, e.g. samples of spoof audio data.

In some embodiments, if the loudspeaker frequency response is known (an example of a priori knowledge), the (relevant) energy ratios (e.g. O LF-MFCC coefficients) can be selected to describe this loudspeaker frequency response well. If the frequency response of the loudspeakers is not known, but spoof data (an example of develop data) is available, the most discriminative energy ratios (e.g. O LF-MFCC coefficients) can be determined heuristically.

In some embodiments of the invention, a DC offset removal module, which is typically used in conventional speech based front ends, may be used, while in other embodiments of the invention, though such DC offset removal module may not be used. A DC offset removal module may for example be designed as a high pass filter.

There may thus be O different LF-MFCC considered resulting in a O dimensional vector of LF-MFCC.

The value of $\phi_{hs}$ and $\phi_{ls}$ for the model used for finding MF may be the same or different from each other. The values of $\phi_{hs}$ and $\phi_{ls}$ used in the model for finding the LF-MFCC may also be the same, or may be different.

In some embodiments, MF and LF-MFCC may be comprised in the parameters (or be the parameters) describing the audio data parameters. In that case, $f_a$ may correspond to $f_d$, and/or $f_b$ may correspond to $f_u$. In other embodiments comprising MF and LF-MFCC, $f_a$ may not correspond to $f_d$ and/or $f_b$ may not correspond to $f_u$.

Accordingly, in some embodiments comprising MF and LF-MFCC $\gamma_a$ may have the same value as or a different value than $\gamma_d$ and/or $\gamma_b$ may have the same value as or a different value than $\gamma_u$. Furthermore, $\phi_{ls}$ for the model used for finding MF may correspond to or be different from $\phi_{ls}$ used in the model for finding the LF-MFCC and/or $\phi_{hs}$ for the model used for finding MF may correspond to or be different from $\phi_{hs}$ used in the model for finding the LF-MFCC. Optionally, $\gamma_a$ may have the same value as or a different value than $\gamma_u$, and/or $\gamma_b$ may have the same value as or a different value than $\gamma_d$.

When MF and LF-MFCC are use or comprised in the parameters describing the audio data, the vector describing the audio data has 1+O or at least 1+O dimensions (1 for the MF, O (the number of coefficients) for the LF-MFCC). For example, in one embodiment the audio may be described by a vector which has O+1 dimensions $$y_{audio} = \begin{pmatrix} MF \\ LF\_MFCC_o \end{pmatrix} \quad (12)$$

In a system according to the invention, initial parameters for the Gaussian classifier may be derived from training audio data, usually training data files. Typically, more than 40, for example more than 100 different training audio data files are used. The training audio data may comprise or consist of enrollment audio data of a previous enrollment into a speaker recognition system.

The parameters for the Gaussian(s) of the Gaussian classifier, for example, mean vector(s) describing the spoof audio data $\mu_{spoof,1}$ and optionally $\mu_{spoof,2} \ldots (\mu_{spoof,c_{spoof}}$ with $c_{spoof} \in [1,C_{spoof}])$ and/or mean vector(s) describing genuine (non-spoof) audio data $\mu_{non-spoof,1}$ and optionally $\mu_{non-spoof,2} \ldots (\mu_{non-spoof,c_{non-spoof}}$ with $c_{non-spoof} \in [1,C_{non-spoof}])$ and covariance matrix/matrices $\Sigma_{non-spoof,1}$ and optionally $\Sigma_{non-spoof,2} \ldots (\Sigma_{non-spoof,c_{non-spoof}}$ with $c_{non-spoof} \in [1,C_{non-spoof}])$ describing non-spoof distribution(s) and/or covariance matrix/matrices describing spoof distribution(s) $\Sigma_{spoof,1}$, and optionally $\Sigma_{spoof,2} \ldots (\Sigma_{spoof,c_{spoof}}$ with $c_{spoof} \in [1,C_{spoof}])$ may be determined.

For determining the mean vector(s) describing the spoof audio data and/or covariance matrix/matrices describing spoof distribution(s), spoof audio data may be required.

For determining the mean vector(s) describing genuine (non-spoof) audio data and/or covariance matrix/matrices describing genuine (non-spoof) distribution(s), genuine audio data may be required.

Each covariance matrix which is determined may be diagonal or non-diagonal.

For describing one Gaussian, a mean vector and a covariance matrix are required. They are typically estimated by a suitable algorithm, e.g. by an Expectation Maximization algorithm (EM) (as disclosed e.g. in A. P. Dempster, N. M. Laird and D. B. Rubin, "Maximum likelihood from incomplete data via the EM algorithm", Journal of the Royal Statistical Society, 39(1)) and are typically derived from the training audio data or may for example be given by a parameter known to the system and/or provided by a third party.

When more than one Gaussian, for example, 2, 3, 4 or more Gaussians are to be described, for example, in a Gaussian mixture model, a mean vector and covariance matrix are required for each Gaussian. In addition, the a priori probabilities of the components (the Gaussians) are also required. These are usually written as $w_{spoof,1}$, $w_{spoof,2}$, . . . ($w_{spoof,c_{spoof}}$, with $c_{spoof} \in [1, C_{spoof}]$) and/or $w_{non-spoof,1}$, $w_{non-spoof,2}$, . . . ($w_{non-spoof,c_{non-spoof}}$, with $c_{non-spoof} \in [1, C_{non-spoof}]$) for each Gaussian component c. The parameters are typically estimated by a suitable algorithm, e.g. by an EM and are typically derived from the training audio data or may for example be given by a parameter known to the system or provided by a third party.

In the particular case where $C_{non-spoof}=1$ and/or $C_{spoof}=1$, the a priori probability/a priori probabilities may be any positive value, e.g. be 1.

The training audio data used for deriving the parameters for the Gaussian classifier are usually chosen depending on the information that the Gaussian classifier should model. In the training data usually audio data is comprised for any kind of spoof which the classifier should recognize. Additionally, depending on the nature of the genuine (non-spoof) data expected to be used in the speaker recognition system, genuine audio data may also be present.

For example, when using a system according to the invention in combination with a text-dependent speaker recognition system working with a certain passphrase and/or a certain device and/or a certain kind of speaker, the training data should be recorded with the certain passphrase and/or the certain device and/or a certain speaker (e.g. speakers of the particular language that will be used in the speaker recognition system for which it is to be classified whether the received audio data is genuine or a spoof).

A system according to the invention may in particular be adapted for use with far-field attacks, (which may optionally be inserted directly into the speaker recognition system), and/or replay attacks.

Spoof data may also be available and may be used to derive parameters for the Gaussian classifier. Preferably, spoof data covers the most important or all of the spoof attacks to be expected or which should be classified as spoof by the system, for example, recording, e.g. far-field recording, and/or replay attacks, etc.

A system according to the invention may thus take advantage of the parameters that are present in the training data, for example, a passphrase and/or the device and/or the certain speakers and/or the spoof variability because the parameters of the Gaussian classifier are determined based on training audio data describing these features.

For example, there are embodiments where the non-spoof region of parameters is described by a Gaussian and the spoof region of parameters is described by a Gaussian. Usually, these Gaussians are described over a space having as many dimensions as parameters of the audio data are considered for classifying whether audio data is spoof or genuine.

In embodiments where the non-spoof region of parameters is described by one Gaussian and the spoof region of parameters is described by one Gaussian, mean vector $\mu_{spoof,1}$ of the spoof distribution and mean vector $\mu_{non-spoof,1}$ of the non-spoof distribution and covariance matrix $\Sigma_{non-spoof,1}$ of the non-spoof distribution and covariance matrix of the spoof distribution $\Sigma_{spoof,1}$ may each be determined or given as starting parameters for the Gaussians. In said example, the prior distributions may be defined as:

$$y|\text{non-spoof} \sim N(y; \mu_{non-spoof,1}, \Sigma_{non-spoof,1}) \quad (13)$$

$$y|\text{spoof} \sim N(y; \mu_{spoof,1}, \Sigma_{spoof,1}) \quad (14).$$

Herein, y represents the parameters considered in an audio data. For an embodiment where the two parameters are a feature vector distance and a spectral ratio $$y = \begin{pmatrix} \Delta \\ SR \end{pmatrix}$$

(according to (8)). In other embodiments, y may represent the parameters MF and LF-MFCC$_o$ (according to (12)), and in further embodiments, y may represent or comprise a combination of any of the above-mentioned parameters feature vector distance, spectral ratio, MF and/or LF-MFCC$_o$.

There are also embodiments where the non-spoof region of parameters and/or the spoof region of parameters are described by more than one Gaussian, e.g. one GMM composed by 2, 3 or more components c. In such cases, for each GMM, a mean vector value, a covariance matrix and an a priori probability are determined or given per component (Gaussian). In said example, the prior distributions may be defined as:

$$y | \text{non-spoof} \sim \sum_{c_{non-spoof}=1}^{C_{non-spoof}} w_{non-spoof,c_{non-spoof}} N\left(y; \mu_{non-spoof,c_{non-spoof}}, \Sigma_{non-spoof,c_{non-spoof}}\right) \quad (15)$$

$$y | \text{spoof} \sim \sum_{c_{spoof}=1}^{C_{spoof}} w_{spoof,c_{spoof}} N\left(y; \mu_{spoof,c_{spoof}}, \Sigma_{spoof,c_{spoof}}\right) \quad (16)$$

Alternatively, the space of the vector representing the parameters of the audio data, e.g. the space in which y lies (e.g. the space composed by MF and LF_MFCC$_O$) may be modeled using a certain number C of full-covariance Gaussians (GMM) for spoof and non-spoof data. $C_{spoof}$ may be the same as or different than $C_{non-spoof}$. Alternatively or additionally, diagonal matrices may be used for one or more or all of the covariance matrices describing the spoof and/or non-spoof data, wherein the following prior distribution of equations (15) and/or (16) may be used as starting point.

The parameters in (15) and (16) may e.g. be estimated with (prior) data and a suitable algorithm e.g. Expectation Maximization (EM) algorithm, e.g. as described above or similar thereto.

The data used to extract prior distributions may, in some embodiments, depend on the information that is to be modeled e.g. as described previously or e.g. taking into consideration the nature of the spoof and non-spoof data (sort of speakers, passphrases, recording devices . . . ). For example, for a text-dependent Speaker Recognition system which works with a certain passphrase ("Hello world", for example), device (Iphone 4S, for example) and kind of speakers, (British ones for example), all the required data (spoof and/or non-spoof) may be recorded with the corresponding circumstances e.g. a British speaker saying "Hello world" with an Iphone 4S. Typically, it is advantageous to match the use case and the data to extract the prior distribution.

Thus, in some embodiments, it may be advantageous to use appropriate circumstances, e.g. for extracting prior distributions, e.g. of the passphrase, device and/or speaker for spoof and/or non-spoof.

Given such a model (e.g. one of the ones described above) with initial parameters, wherein a model with initial parameters may comprise a model wherein the initial parameters have been determined as described above, but also a model comprising parameters found in a different way (e.g. a model provided by a third party or a model which has been adapted previously), it may be (further) adapted by adaptation of the previous parameters of the Gaussian classifier using labeled adaptation audio data. This may be advantageous, if, for example, the adaptation audio data, typically adaptation audio data files, describe certain types of situations, for example, certain spoof attacks and/or genuine audio data which is not or not adequately described by the previously used classifier. Usually, the adaptation audio data is chosen depending on the information that the Gaussian classifier should model.

Such an adaptation may be done using a suitable algorithm, for example, using a maximum a posteriori (MAP) algorithm (as disclosed in e.g. J. Gauvin and C. Lee "Maximum Posteriori Estimation for Multivariate Gaussian Mixture Observations of Markov Chains" IEEE Transactions on Speech and Audio Processing, 2(2): 291-298). In particular, for example, the mean vector of the 1, 2, 3, 4, or more Gaussians representing the genuine audio data may be adapted as $$\mu_{new,non-spoof,c_{non-spoof}} = \mu_{initial,non-spoof,c_{non-spoof}} \alpha_{ns} + \quad (17)$$

$$(1 - \alpha_{ns}) \cdot \frac{\sum_{i=1}^{N_{ns}} \gamma_{non-spoof,c_{non-spoof}}(i) y_{non-spoof,i}}{\sum_{i=1}^{N_{ns}} \gamma_{non-spoof,c_{non-spoof}}(i)}$$

$$\gamma_{non-spoof,c_{non-spoof}}(i) = \quad (17.1)$$

$$\frac{w_{initial,non-spoof,c_{non-spoof}} N(y_{non-spoof,i}; \mu_{initial,non-spoof,c_{non-spoof}}, \Sigma_{initial,non-spoof,c_{non-spoof}})}{\sum_{c_{non-spoof}=1}^{C_{non-spoof}} w_{initial,non-spoof,c_{non-spoof}} N(y_{non-spoof,i}; \mu_{initial,non-spoof,c_{non-spoof}}, \Sigma_{initial,non-spoof,c_{non-spoof}})}$$

Additionally or alternatively, the mean vectors of the 1, 2, 3, 4, or more Gaussians representing the spoof region of audio data parameters may be adapted as $$\mu_{new,spoof,c_{spoof}} = \quad (18)$$

$$\mu_{initial,spoof,c_{spoof}} \alpha_s + (1 - \alpha_s) \cdot \frac{\sum_{i=1}^{N_s} \gamma_{spoof,c_{spoof}}(i) y_{spoof,i}}{\sum_{i=1}^{N_s} \gamma_{spoof,c_{spoof}}(i)}$$

$$\gamma_{spoof,c_{spoof}}(i) = \frac{w_{initial,spoof,c_{spoof}} N(y_{spoof,i}; \mu_{initial,spoof,c_{spoof}}, \Sigma_{initial,spoof,c_{spoof}})}{\sum_{c_{spoof}=1}^{C_{spoof}} w_{initial,spoof,c_{spoof}} N(y_{spoof,i}; \mu_{initial,spoof,c_{spoof}}, \Sigma_{initial,spoof,c_{spoof}})} \quad (18.1)$$

Additionally or alternatively, the covariance matrices of the 1, 2, 3, 4, or more Gaussians representing the genuine region of audio data parameters and/or the 1, 2, 3, 4 or more covariance matrices representing the spoof region of audio data parameters may be adapted by $$\Sigma_{new,non-spoof,c_{non-spoof}} = \Sigma_{initial,non-spoof,c_{non-spoof}} \alpha_{ns} + \quad (19)$$

$$(1 - \alpha_{ns}) \cdot \frac{\sum_{i=1}^{N_{ns}} \gamma_{non-spoof,c_{non-spoof}}(i)(y_{non-spoof,i} - \mu_{non-spoof,\Sigma})^2}{\sum_{i=1}^{N_{ns}} \gamma_{non-spoof,c_{non-spoof}}(i)}$$

$$\mu_{non-spoof,\Sigma} = \frac{\sum_{i=1}^{N_{ns}} \gamma_{non-spoof,c_{non-spoof}}(i) y_{non-spoof,i}}{\sum_{i=1}^{N_{ns}} \gamma_{non-spoof,c_{non-spoof}}(i)} \quad (19.1)$$

$$\Sigma_{new,spoof,c_{spoof}} = \Sigma_{initial,spoof,c_{spoof}} \alpha_s + \quad (20)$$

$$(1 - \alpha_s) \cdot \frac{\sum_{i=1}^{N_s} \gamma_{spoof,c_{spoof}}(i)(y_{spoof,i} - \mu_{spoof,\Sigma})^2}{\sum_{i=1}^{N_s} \gamma_{spoof,c_{spoof}}(i)}$$

$$\mu_{spoof,\Sigma} = \frac{\sum_{i=1}^{N_s} \gamma_{spoof,c_{spoof}}(i) y_{spoof,i}}{\sum_{i=1}^{N_s} \gamma_{spoof,c_{spoof}}(i)} \quad (20.1)$$

Herein, $\mu_{initial,non-spoof,c_{non-spoof}}$, $\mu_{initial,spoof,c_{spoof}}$, $\Sigma_{initial,spoof,c_{spoof}}$, $\Sigma_{initial,non-spoof,c_{non-spoof}}$ are the parameters of the initial models for component $c_{non-spoof}$ and $c_{spoof}$ and $\gamma_{non-spoof,c_{non-spoof}}(i)$ and $\gamma_{spoof,c_{spoof}}(i)$ are the posterior probability of the initial $c_{non-spoof}$ and $c_{spoof}$ component of non-spoof and spoof models, given $y_{non-spoof,i}$ and $y_{spoof,i}$, respectively (adaptation data). In a system according to the invention, the a priori probabilities of the components $w_{initial,spoof,c_{spoof}}$ and/or $w_{initial,non-spoof,c_{non-spoof}}$ may be adapted or may not be adapted.

The adaptation of one or more or all of the $w_{initial,spoof,c_{spoof}}$ and/or $w_{initial,non-spoof,c_{non-spoof}}$ may not be necessary because no relevant improvements with regard to adaptation of the other components may be given by such an adaptation. In other embodiments, some or all of these a priori probabilities of the components may be adapted.

$N_{ns}$ and $N_s$ are the numbers of the non-spoof and spoof audios used to adapt the initial models, which are represented by $y_{non-spoof,i}$ and $y_{spoof,i}$, respectively (i index corresponds to the i-th audio data file). $c_{non-spoof}$ and $c_{spoof}$ are the number of components of non-spoof and spoof GMMs. Finally, $\alpha_{ns}$ and $\alpha_s$ are the weighing values for non-spoof and spoof adaptation, which are configuration variables that may e.g. be computed as:

$$\alpha_{ns} = \frac{\tau}{\tau + N_{ns}} \quad (21)$$

$$\alpha_s = \frac{\tau}{\tau + N_s}. \quad (22)$$

$\tau$ is the memory term that may be defined as a certain number, e.g. may be defined to be 2, 3, 4 or more, for example.

In a system according to the invention, the number of available samples of adaptation audio data may be considered in the adaptation process, e.g. as indicated in equations (21) and/or (22), which may be used in one or more of equations (17), (18), (19) and/or (20) and/or (25) and/or (26). In some embodiments of the system according to the invention, new parameters for the Gaussian classifier are found by adaptation of initial (previous) parameters of the Gaussian classifier using adaptation data which only comprises genuine audio data, usually several genuine audio data files. Then, instead of equation (18), the mean vectors of the 1, 2, 3, 4, or more Gaussians representing the spoof region of audio data parameters may be calculated as:

$$\mu_{new,spoof,c_{spoof}} = \quad (23)$$
$$\mu_{initial,spoof,c_{spoof}} + \sum_{c_{non-spoof}=1}^{c_{non-spoof}} w_{initial,non-spoof,c_{non-spoof}}$$
$$\left( \mu_{new,non-spoof,c_{non-spoof}} - \mu_{initial,non-spoof,c_{non-spoof}} \right)$$

instead of using equation (18). In such a situation, the spoof covariance matrices are usually not adapted. In some embodiments, however, the spoof covariance matrices may be adapted, for example according to (20) or (25).

In some embodiments of the system according to the invention, new parameters for the Gaussian classifier are found by adaptation of initial (previous) parameters of the Gaussian classifier using adaptation data which only comprises spoof audio data, usually several spoof audio data files. Then, instead of equation (17), the mean vectors of the 1, 2, 3, 4, or more Gaussians representing the genuine region of audio data parameters may be calculated as:

$$\mu_{new,non-spoof,c_{non-spoof}} = \mu_{initial,non-spoof,c_{non-spoof}} + \quad (24)$$
$$\sum_{c_{spoof}=1}^{c_{spoof}} w_{initial,spoof,c_{spoof}} \left( \mu_{new,spoof,c_{spoof}} - \mu_{initial,spoof,c_{spoof}} \right)$$

instead of using equation (17). In such a situation, the non-spoof covariance matrices are usually not adapted. In some embodiments, however, the non-spoof covariance matrices may be adapted, for example according to (19) or (26).

A system according to the invention may also be adapted if no separate adaptation audio data is present. In such a case, the enrollment audio data may be considered to comprise the adaptation audio data. In such a case, adaptation may be done using a leave-one-out technique. Such a leave-one-out technique may in particular be relevant when the feature vector distance is one of the parameters to be adapted, and in some embodiment leave-one-out technique may only be used for adaptation of the feature vector distance.

This may e.g. be done by taking into consideration all enrolment data files which are present except one which is under consideration to extract the feature vector distance for the audio data file under consideration. When doing that for each of the enrolment audio data files, for each enrolment audio data file, a vector with the considered parameters of the audio data may be extracted, e.g. a two dimensional vector describing the spectral ratio and a feature vector distance. In some embodiments, such a leave-one-out technique is not used for all enrolment data files, but only for some which describe certain situations of interest. Using enrolment data for adaptation may imply having a spoof model and a non-spoof model for each enrolled speaker.

Afterwards, the mean vectors may be adapted, e.g. using equation (17) and (18) or equation (17) and (23), while the covariance matrices may not be altered. In other embodiments, additionally to the mean vectors, the non-spoof covariance(s) may be adapted using equation (19) or (26). In some embodiments, enrolment data may consist of or comprise non-spoof audio data (e.g. audio files). In that case, equations (17) and (23) may be used to adapt the mean values for spoof and non-spoof mean values and optionally, the non-spoof covariance may be adapted according to (19) or (26). In other embodiments, the enrollment may comprise spoof data in addition to or alternatively to genuine (non-spoof) audio data, and equations (18), (24) and/or (20) and/or (25) may be used for adaptation in addition or alternatively to (17), (19) and/or (26).

In other embodiments in the system according to the invention, model adaptation may not be used, e.g. because it may not be necessary. This may for example be the case if there is no adaptation data present that properly describes the situations to be considered. If that is the case, an adaptation may be disadvantageous.

In other embodiments of the invention, given such a model with initial parameters, wherein a model with initial parameters may comprise a model wherein the initial parameters have been determined as described above, but also a model comprising parameters found in a different way (e.g. a model provided by a third party or a model which has been adapted previously), it may be (further) adapted by adaptation of the previous parameters of the Gaussian classifier, e.g. if additional data for adaptation is available. This may for example be done using a suitable algorithm, e.g. a MAP algorithm, for example as described in the following:

Given an initial model for spoof and/or non-spoof data (e.g., the prior one), it can be adapted if some data are available, using Maximum A Posteriori, MAP, algorithm.

For example, the mean vector of the 1, 2, 3, 4 or more Gaussians representing non-spoof audio data may be adapted in accordance with equation (17), and/or the mean vector of the 1, 2, 3, 4 or more Gaussians representing spoof audio data may be adapted in accordance with equation (18).

Additionally, the covariance matrices of the 1, 2, 3, 4 or more Gaussians representing the spoof data (or only part of the covariance matrices of the 1, 2, 3, 4 or more Gaussians representing the spoof data) may in some embodiments be adapted using the following equation.

$$\Sigma_{new,spoof,c_{spoof}} = \Sigma_{initial,spoof,c_{spoof}} \cdot \alpha_s + (1-\alpha_s) \cdot \quad (25)$$

$$\left[ \frac{1}{\sum_{i=1}^{N_s} \gamma_{spoof,c_{spoof}}(i)} \sum_{i=1}^{N_s} \gamma_{spoof,c_{spoof}}(i) \cdot (y_{spoof,i} - \mu_{spoof,c_{spoof}})^2 + \mu_{initial,spoof,c_{spoof}}^2 \right] - \mu_{new,spoof,c_{spoof}}^2$$

Herein, $$\mu_{spoof,c_{spoof}} = \frac{\sum_{i=1}^{N_s} \gamma_{spoof,c_{spoof}}(i) y_{spoof,i}}{\sum_{i=1}^{N_s} \gamma_{spoof,c_{spoof}}(i)} \quad (25.1)$$

Additionally or alternatively, the covariance matrices of the 1, 2, 3, 4 or more Gaussians representing the non-spoof data (or only part of the covariance matrices of the 1, 2, 3, 4 or more Gaussians representing the non-spoof data) may in some embodiments be adapted using the following equation.

$$\Sigma_{new,non\text{-}spoof,c_{non\text{-}spoof}} = \Sigma_{initial,non\text{-}spoof,c_{non\text{-}spoof}} \cdot \alpha_{ns} + \quad (26)$$

$$(1-\alpha_{ns}) \cdot \left[ \frac{1}{\sum_{i=1}^{N_{ns}} \gamma_{non\text{-}spoof,c_{non\text{-}spoof}}(i)} \sum_{i=1}^{N_{ns}} \gamma_{non\text{-}spoof,c_{non\text{-}spoof}}(i) \cdot (y_{non\text{-}spoof,i} - \mu_{non\text{-}spoof,c_{non\text{-}spoof}})^2 + \mu_{initial,non\text{-}spoof,c_{non\text{-}spoof}}^2 \right] - \mu_{new,non\text{-}spoof,c_{non\text{-}spoof}}^2$$

Herein, $$\mu_{non\text{-}spoof,c_{non\text{-}spoof}} = \frac{\sum_{i=1}^{N_{ns}} \gamma_{non\text{-}spoof,c_{non\text{-}spoof}}(i) \cdot y_{non\text{-}spoof,i}}{\sum_{i=1}^{N_{ns}} \gamma_{non\text{-}spoof,c_{non\text{-}spoof}}(i)} \quad (26.1)$$

Herein, the variables typically correspond to the variables which have been introduced previously (e.g. i refers to the number of audio data files used for adaptation . . . ).

Covariance matrices may in some embodiments be adapted using a suitable algorithm, e.g. MAP algorithm, as (25) and/or (26); however, in other embodiments this may not be done or may not be possible due to the reduced size of the adaptation data. For example, in those circumstances, the covariance matrices may not be adapted. Initial models for spoof and/or non-spoof data may e.g. be the prior ones, but may alternatively also be others obtained after a previous adaptation. Typically, some prior distributions are needed.

Another limitation may be the spoof data availability. In some cases, it is not possible to have representative spoof data, and the model adaptation must be carried out only with non-spoof data. Then, equation (18) may be replaced by equation (23) and the spoof covariance matrix would typically not be adapted (but may be adapted in some embodiments).

In other embodiments, only spoof data may be available, and some model adaptation may be carried out with spoof data only, e.g. by replacing equation (17) with (24). Also in that case, the spoof covariance matrix would typically not be adapted (but may be adapted in some embodiments).

The nature of the adaptation data may be chosen to match with the use case conditions (e.g. loudspeaker typically used for spoof in replay attacks, passphrase, device, speaker and/or other conditions). The nature of the adaptation data is typically chosen to match with the use case conditions in terms of passphrase, device, speaker and/or spoof. Then, variability of those variables can be taken into account.

In other embodiments under some circumstances, adaptation data may not be available. Then, model adaptation may be completed just with enrollment data, e.g. using the above mentioned equation(s) with or without adaptation of the covariance matrices. In other embodiments, such an approach may (only) provide a speaker model adapted non spoof model.

Typically, the model adaptation data may depend on the aspects that classifier should be adapted to in terms of speakers, passphrases, and/or recording devices and/or loudspeakers (e.g. the ones typically used in replay attacks) . . . . For example, if the initial model is adapted to a given device, speaker and passphrase, some audios of the speaker, saying the required passphrase and recorded with the corresponding device would typically be used.

In other embodiments, model adaptation may not be necessary. It may, for example, not be necessary when the adaptation data does not match properly with the case for which it is intended to be used. Under those circumstances, an adaptation may be disadvantageous and worsen the results with regard to an initial model. In many such embodiments, no adaptation may be used.

Given a system according to the invention with initial or adapted parameters for the Gaussian classifier, audio data received in a speaker recognition system may be classified by extracting the parameters of the received audio data considered in a system according to the invention and evaluating the likelihood for the 1, 2, 3, 4, or more Gaussians modeling the genuine region of audio data parameters and/or the 1, 2, 3, 4, or more Gaussians modeling the spoof-region of audio data parameters.

If the likelihood that the parameters y of the audio data are in the spoof-region of parameters describing audio data from the posterior distribution is larger than k times the likelihood that the parameters y of the audio data are in the non-spoof region of parameters describing audio data from the posterior distribution, the audio data under consideration is considered spoof. Herein, k is a compensation term being determined based e.g. on the prior probabilities of spoof and non-spoof, the relative costs of classification error, and/or other considerations. This may e.g. be written as:

$$\sum_{c_{spoof}=1}^{C_{spoof}} w_{new,spoof,c_{spoof}} N(y; \mu_{new,spoof,c_{spoof}}, \Sigma_{new,spoof,c_{spoof}}) > \quad (27)$$

$$k \sum_{c_{non-spoof}=1}^{C_{non-spoof}} w_{new,non-spoof,c_{non-spoof}}$$

$$N(y; \mu_{new,non-spoof}, \Sigma_{new,non-spoof,c_{non-spoof}}) \Rightarrow \text{spoof}.$$

Otherwise, the audio data may be classified as genuine (non-spoof). If a spoof model (Gaussian(s) describing spoof audio data) is not available, the decision could be taken as:

$$\frac{1}{k} > \sum_{c_{non-spoof}=1}^{C_{non-spoof}} w_{new,non-spoof,c_{non-spoof}} \quad (28)$$

$$N(y; \mu_{new,non-spoof}, \Sigma_{new,non-spoof,c_{non-spoof}}) \Rightarrow \text{spoof}$$

Otherwise, the audio data may be classified as genuine (non-spoof).

In other embodiments, if a genuine model (Gaussian(s) describing genuine audio data) is not available, and only a spoof model is available, the decision could be taken as:

$$\sum_{c_{spoof}=1}^{C_{spoof}} w_{new,spoof,c_{spoof}} N(y; \mu_{new,spoof,c_{spoof}}, \Sigma_{new,spoof,c_{spoof}}) > k \Rightarrow \quad (29)$$

spoof

For example, in a system where the Gaussian classifier has been adapted using a lot of genuine audio data, k may be chosen higher than in a situation where the Gaussian classifier has not been adapted or where there are concerns that it may not be adapted to the current situation. Typically, k may be based on the prior probabilities of spoof and non-spoof and/or relative costs of classification error. k may for example be dependent on the number of audios used for adaptation of the model or other parameters. For example, k may be higher if a lot of non-spoof data was available for the adaptation of the model.

For example, k may be set to a number higher than 0, for example, it may be set to 0.1, 0.2, 0.5 or 0.8 or to 1, 2, 3, 4, or more. k is usually not lower than 0 because in such a case, a system may be partial to classify the audio data as spoof.

The invention also comprises a method for classifying whether audio data received in a speaker recognition system is genuine or a spoof using a Gaussian classifier. In particular, said method may comprise each of the steps which may be carried out in a previously described system.

Herein, $w_{new,spoof,c_{spoof}}$ may be equal to $w_{initial,spoof,c_{spoof}}$ for one or more or all $c_{spoof}$ and/or $w_{new,non-spoof,c_{non-spoof}}$ may be equal to $w_{initial,non-spoof,c_{non-spoof}}$ spoof for one or more or all $c_{non-spoof}$. In other embodiments, one, two, three or more or all of the $w_{new,(non)-spoof,c_{(non-)spoof}}$ may be adapted value(s) with regard to the initial a priori probability/probabilities.

BRIEF DESCRIPTION OF THE DRAWINGS

Further explanations with regard to the invention is given in the Figures. Herein.

FIG. 1a shows a step which may be used in a method according to the invention.

FIG. 1b shows a step, which staring from training audio date files, features are extracted.

FIG. 1c shows how the Gaussian(s) may be adapted.

FIG. 1d shows steps which may be carried out according in a system to the invention.

In particular, FIG. 1a shows that e.g. starting from enrollment audio data files parameters describing average feature vectors may be found, for example the mean and the standard deviation of MFCCs describing the enrollment audio data. The enrollment data files may e.g. have been used for the enrollment into the speaker recognition system. This is usually not done in a system according to the invention, but may be done in a system according to the invention in some embodiments.

In other embodiments, the average feature vectors, for example the mean and the standard deviation of MFCCs, are fixed or may also be provided by a third party.

In some embodiments of the invention, the parameters describing average feature vectors are used to calculate the distance of the parameters describing the received audio data thereof in later steps.

Figure 1A:
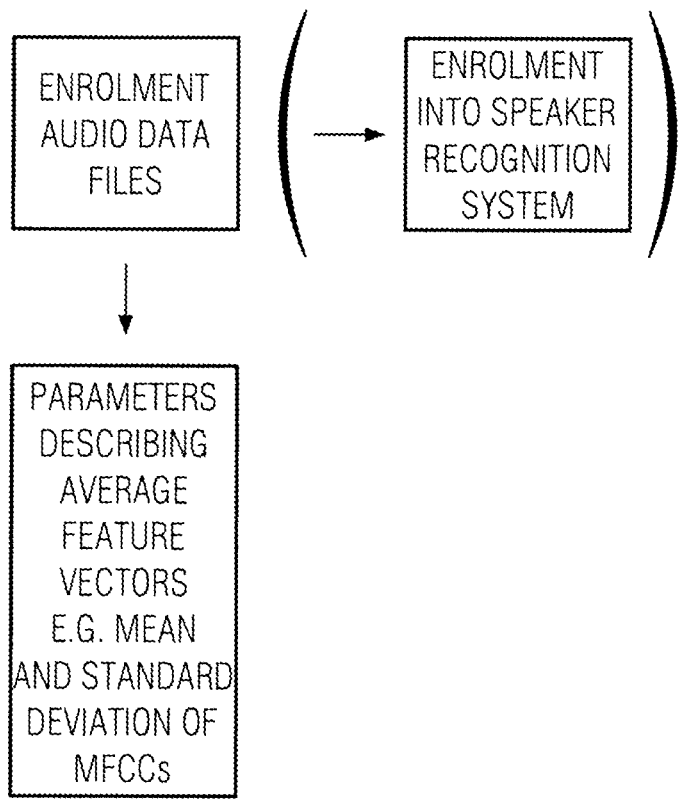
FIGS. 1a, 1b, 1c, and 1d show steps for which a system according to the invention may be adapted.
Figure 1B:
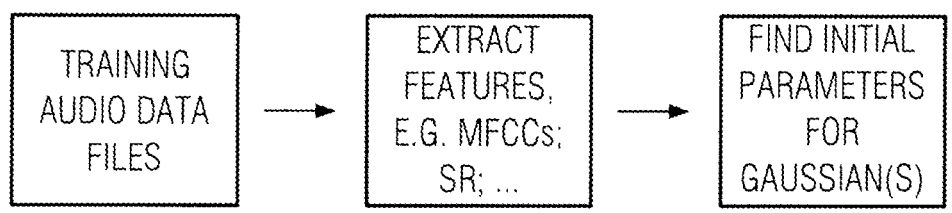

FIG. 1b shows a step where starting from training audio data files which typically comprise genuine and/or spoof audio data, features are extracted, for example, the MFCCs and/or a spectral ratio, and/or other features describing the training audio data files. From these extracted features, the initial parameters for the Gaussian(s) of the Gaussian classifier may be found. For example, the mean, standard deviation and a priori probability per component considering the features, for example the spectral ratio and/or the feature vector distance may be found. The feature vector distance may e.g. be given by the (absolute value of the) distance of the mean MFCCs of the training audio data file to the mean of the MFCCs describing the enrollment audio data divided by the standard deviation of the MFCCs describing the enrollment audio data files. The reference for calculating the feature vector distance (mean of the MFCCs) may alternatively or additionally be provided by a third party and/or a given fixed value.

Figure 1C:
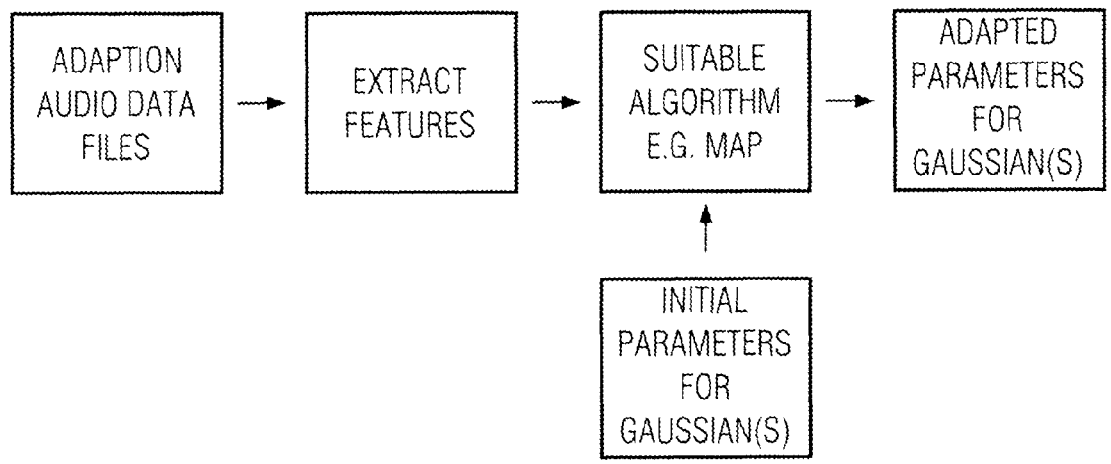

FIG. 1c shows how the parameters for the Gaussian(s) of the Gaussian classifier may be adapted. Starting out from adaptation audio data files, features may be extracted. Considering the initial parameters for the Gaussian(s) and using a suitable algorithm, for example, MAP, the parameters for the Gaussian(s) may then be adapted. Herein, it is to be noted that the initial parameters for the Gaussian(s) may be the initial parameters of the Gaussian found in FIG. 1b, but may also correspond to parameters provided by a third party, given by the system or parameters used in previous models which had already been adapted with regard to other initial parameters and/or other adaptation audio data. An adaptation may e.g. be done for any model that does not fit the situation under consideration properly.

In other embodiments, a system according to the invention does not carry out the steps of FIG. 1c because the initial parameters for the Gaussian(s) describe the situation as well as it is to be expected that an adapted model would, for example, if no suitable adaptation audio data is present.

Figure 1D:
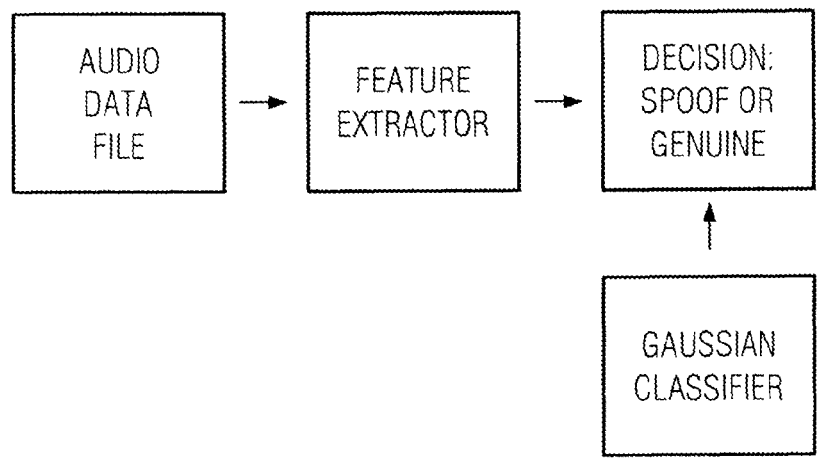

FIG. 1d shows steps which may be carried out in a system according to the invention. In particular, starting from a received audio data file, features are extracted. Then, using the Gaussian classifier and the features extracted from the audio data file, a decision is rendered whether the audio data file under consideration is a spoof or genuine.

Figure 2A:
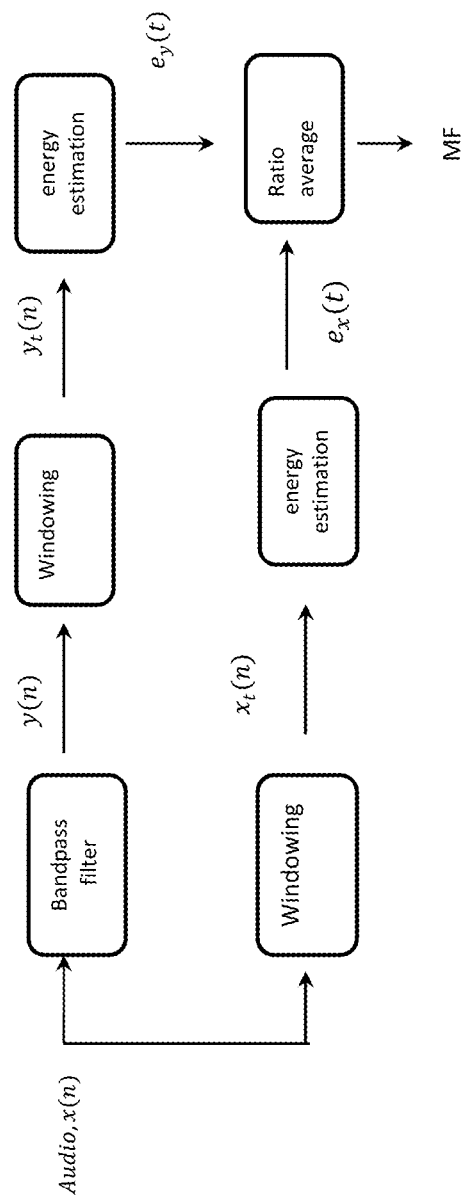
FIG. 2a shows steps which may be used in feature extraction.

FIG. 2a shows steps which may be used for feature extraction, in this case in particular during calculation of a Medium Frequency Relative energy. In particular, an audio signal x(n) is used as input. Starting from audio signal x(n), the audio signal is filtered, for example with a band pass filter as indicated, to extract the frequency components in the desired frequency band between a first frequency $f_a$ and a second frequency $f_b$, thus providing filtered signal y(n).

Both the initial audio x(n) and the filtered version y(n) may then be windowed, for example using Hamming windows, thus generating $x_t(n)$ and $y_t(n)$ for the t-th frame.

Then a variable descriptive of the energy (or an energy) may be computed, for example as mentioned above the equations (9) and (10), thus generating $e_x(t)$ and $e_y(t)$. Then, the ratio of the energy terms may be computed, and averaged over all relevant frames, e.g. all speech frames or all frames with a certain energy or all frames, or frames chosen for other reasons, for example as indicated in equation (11), thus rendering the Medium Frequency Relative Energy (MF).

Figure 2B:
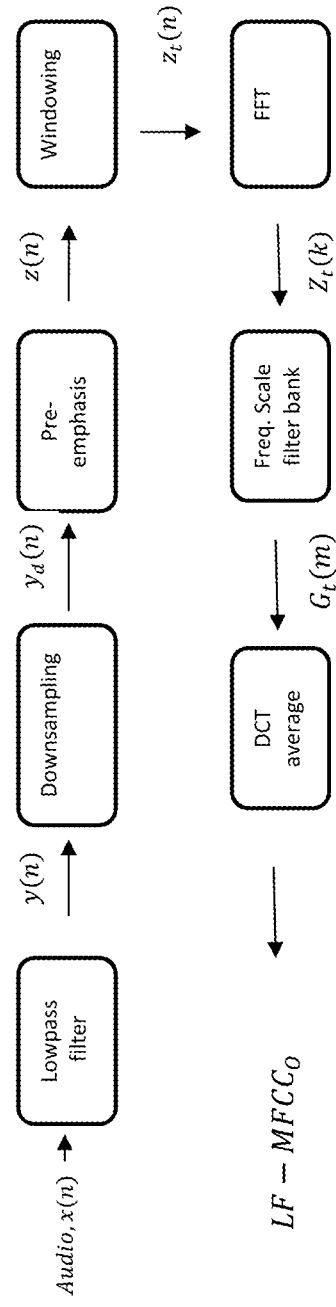
FIG. 2b shows steps which may be used for calculation (extraction) of LF-MFCC$_o$.

FIG. 2b shows steps which may be used for feature extraction, in this particular case for calculation (extraction) of LF-MFCC$_o$.

Starting from an audio signal x(n), an optional filter is applied, which in this embodiment is shown as a low pass filter, rendering filtered signal y(n). Then, optional downsampling of the filtered signal y(n) is carried out rendering $y_d(n)$.

An optional pre-emphasis filter, for example to flatten the speech signal spectrum compensating the inherent tilt due to the radiation phenomenon along with the glottal pulse spectral decay, may be carried out achieving a filtered signal z(n). Such a pre-emphasis filter may for example be a first order high pass band filter with a coefficient value $\zeta$ of approximately 0.87, for example between 0.85 and 0.89.

Optionally, windowing (e.g. Hamming windows) may then be applied to the z(n), generating $z_t(n)$.

After this optional windowing, a Fast Fourier Transformation may be carried out and the absolute value thereof may be computed, thus rendering $Z_t(k)$. In other embodiments, other solutions than FFT may be used to estimate (calculate) the spectrum.

Then, an optional spectral smoothing step may be carried out (e.g. with a frequency scale filter bank) which may for example be used to remove the harmonic structure of speech corresponding to pitch information and/or to reduce the variations of the spectral envelope estimation and/or to achieve a reduction in the number of parameters that could represent each frame spectrum.

This may for example be carried out by filter that operate in the frequency domain by computing a weighted average of the absolute magnitude of the estimation of the spectrum (e.g. FFT values) for each audio window $G_t(m)$. After the filtering, the log of each coefficient may be taken.

To this value, a discrete cosine transformation may be carried out to extract first the components LF-MFCC$_{t,o}$(r) from $G_t(m)$. Then, LF-MFCC$_o$ may be extracted by averaging the selected coefficients of LF-MFCC$_{t,o}$(r) for all relevant frames, e.g. all speech frames, wherein speech frames may for example be defined as explained above, or all frames above a certain energy, or all frames chosen to another criterium.

What is claimed is:

1. A speaker recognition system adapted for receiving audio data, the system being adapted for:
   receiving audio data under test;
   obtaining a Medium Frequency Relative Energy (MF) parameter, comprising a ratio between an energy of the received audio data under test in a predetermined frequency band and an energy of a complete frequency spectrum of the received audio data under test; and
   classifying using a Gaussian classifier whether the received audio data under test is genuine or represents a recording replayed through a loudspeaker, based on the Medium Frequency Relative Energy (MF) parameter, wherein the Gaussian classifier is trained by the following steps:
   a first Gaussian is obtained by:
     receiving genuine audio data;
     obtaining a first Medium Frequency Relative Energy (MF) parameter, comprising the ratio between the energy of the genuine audio data in a predetermined frequency band and the energy of the complete frequency spectrum of the genuine audio data;
     receiving audio data representing recordings replayed through a loudspeaker; and
     modelling the genuine audio data;
   and wherein a second Gaussian is obtained by:
     receiving audio data representing recordings replayed through a loudspeaker;
     obtaining a second Medium Frequency Relative Energy (MF) parameter, comprising the ratio between the energy of the audio data representing recordings replayed through a loudspeaker in a predetermined frequency band and the energy of the complete frequency spectrum of the audio data representing recordings replayed through a loudspeaker; and
     modelling the audio data representing recordings replayed through a loudspeaker with a second Gaussian.

2. A speaker recognition system according to claim 1, wherein a lower end of the predetermined frequency band is in a range from 30 Hz to 150 Hz.

3. A speaker recognition system according to claim 1, wherein an upper end of the predetermined frequency band is in a range from 150 Hz to 270 Hz.

4. A speaker recognition system according to claim 1, wherein the considered parameters of the audio data further comprise a feature vector distance.

5. A speaker recognition system according to claim 4, wherein the feature vector distance is calculated with regard to a constant value.

6. A speaker recognition system according to claim 4, wherein the feature vector distance is calculated with regard to average feature vectors derived from enrolment data.

7. A speaker recognition system according to claim 1, wherein the considered parameters of the audio data further comprise a spectral ratio.

8. A speaker recognition system according to claim 1, wherein new parameters for the Gaussian classifier are found by adaptation of previous parameters of the Gaussian classifier using adaptation audio data.

9. A speaker recognition system according to claim 8, wherein the number of available samples of adaptation audio data is considered in the adaptation process.

10. A speaker recognition system according to claim 8, wherein mean vector(s) and/or covariance matrices and/or an a priori probability of one, two, three, four or more Gaussians representing the region of audio data parameters from genuine audio data and/or wherein mean vector(s) and/or the covariance matrices and/or an a priori probability of one, two, three, four or more Gaussians representing the region of audio data parameters from audio data representing recordings replayed through loudspeakers are adapted.

11. A speaker recognition system according to claim 8, wherein enrollment audio data comprises the adaptation audio data.

12. A speaker recognition system according to claim 8, wherein the adaptation audio data comprises genuine audio data and/or audio data representing a recording replayed through a loudspeaker.

13. A speaker recognition system according to claim 8, wherein the adaptation audio data is chosen depending on information that the Gaussian classifier should model.

14. A method in a speaker recognition system for classifying whether audio data is genuine or represents a recording replayed through a loudspeaker, the method comprising:
  receiving the audio data, and
  classifying using a Gaussian classifier whether the received audio data is genuine or represents a recording replayed through a loudspeaker, wherein Gaussians are used to model a region of audio data parameters from genuine audio data and wherein Gaussians are used to model a region of audio data parameters from audio data representing recordings replayed through loudspeakers, based on a Medium Frequency Relative Energy (MF) parameter, and
  wherein:
    the Medium Frequency Relative Energy (MF) parameter comprises a ratio between an energy of the audio data in a predetermined frequency band and an energy of a complete frequency spectrum of the audio data; and
    the Gaussian classifier is trained by the following steps:
      a first Gaussian is obtained by:
        receiving genuine audio data;
        obtaining a first Medium Frequency Relative Energy (MF) parameter, comprising the ratio between the energy of the genuine audio data in a predetermined frequency band and the energy of the complete frequency spectrum of the genuine audio data;
        receiving audio data representing recordings replayed through a loudspeaker; and
        modelling the genuine audio data;
      and wherein a second Gaussian is obtained by:
        receiving audio data representing recordings replayed through a loudspeaker;
        obtaining a second Medium Frequency Relative Energy (MF) parameter, comprising the ratio between the energy of the audio data representing recordings replayed through a loudspeaker in a predetermined frequency band and the energy of the complete frequency spectrum of the audio data representing recordings replayed through a loudspeaker; and
        modelling the audio data representing recordings replayed through a loudspeaker with a second Gaussian.

15. A non-transitory computer-readable medium comprising computer-readable instructions that, when executed on a computer, are adapted to carry out a method according to claim 14.

16. A speaker recognition system adapted for receiving audio data, the system being adapted for:
  receiving audio data under test;
  obtaining a Low Frequency Mel Frequency Cepstral Coefficients (LF-MFCC) parameter, comprising a ratio between an energy of the received audio data under test in a predetermined frequency band and an energy of a complete frequency spectrum of the received audio data under test; and
  classifying using a Gaussian classifier whether the received audio data under test is genuine or represents a recording replayed through a loudspeaker, based on the Low Frequency Mel Frequency Cepstral Coefficients (LF-MFCC) parameter, wherein the Gaussian classifier is trained by the following steps:
    a first Gaussian is obtained by:
      receiving genuine audio data;
      obtaining a first Low Frequency Mel Frequency Cepstral Coefficients (LF-MFCC) parameter, comprising the ratio between the energy of the genuine audio data in a predetermined frequency band and the energy of the complete frequency spectrum of the genuine audio data;
      receiving audio data representing recordings replayed through a loudspeaker; and
      modelling the genuine audio data;
    and wherein a second Gaussian is obtained by:
      receiving audio data representing recordings replayed through a loudspeaker;
      obtaining a Low Frequency Mel Frequency Cepstral Coefficients (LF-MFCC) parameter, comprising the ratio between the energy of the audio data representing recordings replayed through a loudspeaker in a predetermined frequency band and the energy of the complete frequency spectrum of the audio data representing recordings replayed through a loudspeaker; and
      modelling the audio data representing recordings replayed through a loudspeaker with a second Gaussian.

17. A speaker recognition system according to claim 16, wherein the predetermined cut-off frequency is lower than 750 Hz.

18. A speaker recognition system according to claim 16, wherein the considered parameters of the audio data further comprise a feature vector distance.

19. A speaker recognition system according to claim 18, wherein the feature vector distance is calculated with regard to a constant value.

20. A speaker recognition system according to claim 18, wherein the feature vector distance is calculated with regard to average feature vectors derived from enrolment data.

21. A speaker recognition system according to claim 18, wherein the considered parameters of the audio data further comprise a spectral ratio.

22. A speaker recognition system according to claim 16, wherein new parameters for the Gaussian classifier are found by adaptation of previous parameters of the Gaussian classifier using adaptation audio data.

23. A speaker recognition system according to claim 22, wherein the number of available samples of adaptation audio data is considered in the adaptation process.

24. A speaker recognition system according to claim 22, wherein mean vector(s) and/or covariance matrices and/or an a priori probability of one, two, three, four or more Gaussians representing the region of audio data parameters from genuine audio data and/or wherein mean vector(s)

and/or the covariance matrices and/or an a priori probability of one, two, three, four or more Gaussians representing the region of audio data parameters from audio data representing recordings replayed through loudspeakers are adapted.

25. A speaker recognition system according to claim 22, wherein enrollment audio data comprises the adaptation audio data.

26. A speaker recognition system according to claim 22, wherein the adaptation audio data comprises genuine audio data and/or audio data representing a recording replayed through a loudspeaker.

27. A speaker recognition system according to claim 22, wherein the adaptation audio data is chosen depending on the information that the Gaussian classifier should model.

28. A method in a speaker recognition system for classifying whether audio data is genuine or represents a recording replayed through a loudspeaker, the method comprising:
  receiving the audio data, and
  classifying using a Gaussian classifier whether the received audio data is genuine or represents a recording replayed through a loudspeaker, wherein Gaussians are used to model a region of audio data parameters from genuine audio data and wherein Gaussians are used to model a region of audio data parameters from audio data representing recordings replayed through loudspeakers, based on the Low Frequency Mel Frequency Cepstral Coefficients (LF-MFCC) parameter, and
wherein:
  the Low Frequency Mel Frequency Cepstral Coefficients (LF-MFCC) parameter comprises 1, 2, 3 or more or all LF-MFCC extracted from a region of the audio data having frequencies lower than a predetermined cut-off frequency; and wherein the Gaussian classifier is trained by the following steps:
  a first Gaussian is obtained by:
    receiving genuine audio data;
    obtaining a first Low Frequency Mel Frequency Cepstral Coefficients (LF-MFCC) parameter, comprising the ratio between the energy of the genuine audio data in a predetermined frequency band and the energy of the complete frequency spectrum of the genuine audio data;
    receiving audio data representing recordings replayed through a loudspeaker; and
    modelling the genuine audio data;
  and wherein a second Gaussian is obtained by:
    receiving audio data representing recordings replayed through a loudspeaker;
    obtaining a Low Frequency Mel Frequency Cepstral Coefficients (LF-MFCC) parameter, comprising the ratio between the energy of the audio data representing recordings replayed through a loudspeaker in a predetermined frequency band and the energy of the complete frequency spectrum of the audio data representing recordings replayed through a loudspeaker; and
    modelling the audio data representing recordings replayed through a loudspeaker with a second Gaussian.

29. A non-transitory computer-readable medium comprising computer-readable instructions that, when executed on a computer, are adapted to carry out a method according to claim 28.

30. A speaker recognition system according to claim 16, wherein the predetermined cut-off frequency is between 250 Hz and 750 Hz.

* * * * *